US012603311B2

(12) United States Patent
Huang et al.

(10) Patent No.: US 12,603,311 B2
(45) Date of Patent: Apr. 14, 2026

(54) METAL FUEL FLOW BATTERY MANAGEMENT SYSTEM

(71) Applicant: Talent Innovative Circular Energy Technology Co. Ltd., Taipei City (TW)

(72) Inventors: Kuohsiu David Huang, Taipei (TW); Wen-Huang Liao, Taipei (TW)

(73) Assignee: Talent Innovative Circular Energy Technology Co. Ltd., Taipei City (TW)

( * ) Notice: Subject to any disclaimer, the term of this patent is extended or adjusted under 35 U.S.C. 154(b) by 522 days.

(21) Appl. No.: 18/186,963

(22) Filed: Mar. 21, 2023

(65) Prior Publication Data

US 2024/0145746 A1 May 2, 2024

(30) Foreign Application Priority Data

Oct. 26, 2022 (TW) ................................. 111140641

(51) Int. Cl.
*H01M 8/04746* (2016.01)
*H01M 8/04082* (2016.01)
(Continued)

(52) U.S. Cl.
CPC ... *H01M 8/04753* (2013.01); *H01M 8/04186* (2013.01); *H01M 8/04201* (2013.01);
(Continued)

(58) Field of Classification Search
CPC ......... H01M 8/04753; H01M 8/04186; H01M 8/04201; H01M 8/0432; H01M 8/0438;
(Continued)

(56) References Cited

U.S. PATENT DOCUMENTS 8,273,252 B2 * 9/2012 Matsuura ............ B01F 23/2132
422/127
2006/0127721 A1 6/2006 Calhoon
(Continued)

FOREIGN PATENT DOCUMENTS

| CN | 113540522 | 10/2021 |
| CN | 114792833 | 7/2022 |
| TW | M507079 | 8/2015 |

OTHER PUBLICATIONS

"Office Action of Taiwan Counterpart Application", issued on Nov. 3, 2023, p. 1-p. 6.

*Primary Examiner* — Christian Roldan
(74) *Attorney, Agent, or Firm* — JCIPRNET

(57) ABSTRACT

A metal fuel flow battery management system includes a scattering module configured to receive an air and a fuel; a cell module producing an oxidation reaction between the cell module and the fuel flowing into the cell module to output discharge; a first fuel storage module configured to receive a liquid from the cell module and reduce an oxidized fuel in the liquid from the cell module by charging; a second fuel storage module configured to receive a liquid from the first fuel storage module and deliver the liquid to the scattering module; a plurality of connection channels, and a controller controlling a discharge power of the cell module by controlling flow rates of the air and the fuel. The fuel is sequentially circulated between the scattering module, the cell module, the first fuel storage module, and the second fuel storage module.

16 Claims, 1 Drawing Sheet

(51) Int. Cl.

| | |
|---|---|
| *H01M 8/04089* | (2016.01) |
| *H01M 8/04186* | (2016.01) |
| *H01M 8/0432* | (2016.01) |
| *H01M 8/0438* | (2016.01) |
| *H01M 8/04537* | (2016.01) |
| *H01M 8/18* | (2006.01) |

(52) U.S. Cl.

CPC ....... *H01M 8/0432* (2013.01); *H01M 8/0438* (2013.01); *H01M 8/04574* (2013.01); *H01M 8/188* (2013.01)

(58) Field of Classification Search

CPC ............. H01M 8/04574; H01M 8/188; H01M 8/04097; Y02E 60/50

USPC .......................................................... 429/61

See application file for complete search history.

(56) References Cited

U.S. PATENT DOCUMENTS

| | | | |
|---|---|---|---|
| 2011/0117456 A1 | 5/2011 | Kim et al. | |
| 2013/0084506 A1* | 4/2013 | Chang ................... | H02J 7/0042 |
| | | | 324/432 |
| 2014/0170519 A1* | 6/2014 | Subbotin ........... | H01M 8/04276 |
| | | | 702/63 |
| 2017/0179511 A1* | 6/2017 | Jung ................. | H01M 8/04686 |
| 2018/0269514 A1* | 9/2018 | Kim .................. | H01M 8/04201 |
| 2022/0311035 A1* | 9/2022 | Tagami .............. | H01M 8/0618 |

* cited by examiner

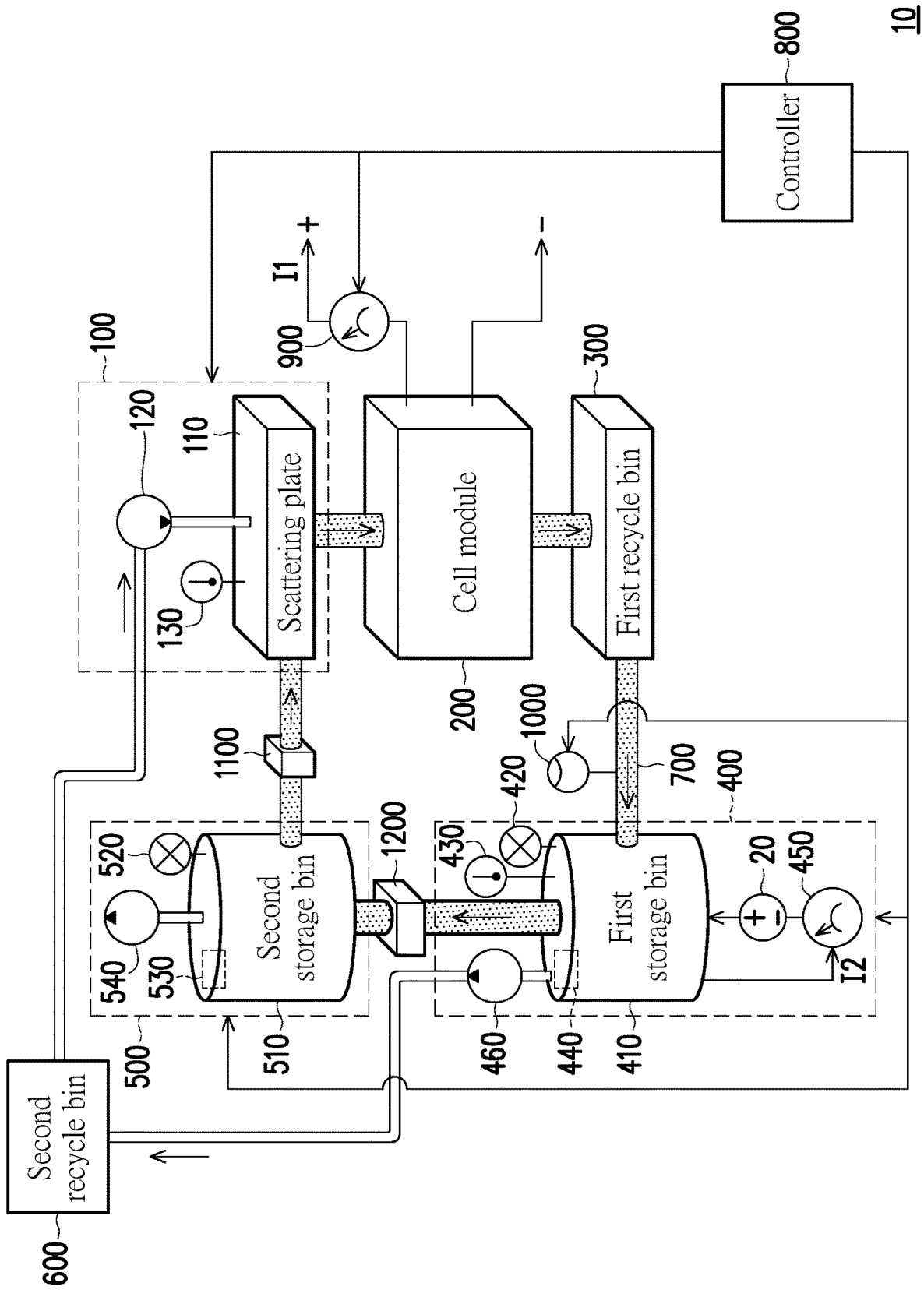

METAL FUEL FLOW BATTERY MANAGEMENT SYSTEM

CROSS-REFERENCE TO RELATED APPLICATION

This application claims the priority benefit of Taiwan application no. 111140641, filed on Oct. 26, 2022. The entirety of the above-mentioned patent application is hereby incorporated by reference herein and made a part of this specification.

BACKGROUND

Technical Field

The disclosure relates to a battery management system. In particular, the disclosure relates to a metal fuel flow battery management system.

Description of Related Art

Compared with the conventional flow battery with relatively high power consumption and relatively low efficiency, a metal fuel flow battery has the advantages of a secondary battery, a flow battery, and a fuel battery, and may store a relatively large amount of electricity at relatively low cost if accompanied with fuel regeneration and reduction, satisfying requirements of the current energy storage market. A filler metal fuel may play the role of energy creation, which is suitable for application environments such as independent power supply and backup power supply. However, the existing recovering of a reduced fuel for reusing in a fuel cell may be relatively inefficient, and cannot address the issue that a discharge power of the cell gradually decreases, and cannot be stabilized, as the fuel is oxidized.

SUMMARY

The disclosure provides a metal fuel flow battery management system that stably provides a discharge power.

An embodiment of the disclosure provides a metal fuel flow battery management system including a scattering module, a cell module, a first fuel storage module, a second fuel storage module, a plurality of connection channels, and a controller. The scattering module is configured to receive an air and a fuel. The cell module is connected to the scattering module. The cell module produces an oxidation reaction between the cell module and the fuel flowing into the cell module to output discharge. The scattering module is configured to cause the fuel to evenly flow into the cell module after passing through the scattering module. The first fuel storage module is configured to receive a liquid from the cell module and reduce an oxidized fuel in the liquid from the cell module by charging. The second fuel storage module is configured to receive a liquid from the first fuel storage module and deliver the liquid to the scattering module. The connection channels are configured to connect between the second fuel storage module and the scattering module, between the cell module and the first fuel storage module, and between the first fuel storage module and the second fuel storage module, to sequentially circulate the fuel between the scattering module, the cell module, the first fuel storage module, and the second fuel storage module. The controller is electrically connected to the scattering module, the cell module, the first fuel storage module, and the second fuel storage module. The controller controls a discharge power of the cell module by controlling a flow rate of the air and a flow rate of the fuel.

Based on the foregoing, in the metal fuel flow battery management system of an embodiment of the disclosure, the controller controls the discharge power of the cell module by controlling the flow rates of the air and the fuel. Accordingly, the metal fuel flow battery management system may be designed as an efficient management system: making the cell module output power stably at the same time of controlling the discharge power by regulating the flow rates of the air and the fuel and the power of reducing the oxidized fuel by charging. In the meantime, circulating the fuel also increases the service lifespan of the cell module.

BRIEF DESCRIPTION OF THE FIGURE

The FIGURE is a schematic diagram of a metal fuel flow battery management system according to an embodiment of the disclosure.

DESCRIPTION OF THE EMBODIMENTS

The FIGURE is a schematic diagram of a metal fuel flow battery management system according to an embodiment of the disclosure. With reference to the FIGURE, an embodiment of the disclosure provides a metal fuel flow battery management system 10 including a scattering module 100, a cell module 200, a first fuel storage module 400, a second fuel storage module 500, a plurality of connection channels 700, and a controller 800.

In this embodiment, the scattering module 100 is configured to receive an air and a fuel. The cell module 200 is connected to the scattering module 100, and produces an oxidation reaction between the cell module 200 and the fuel flowing into the cell module 200 to output discharge. The scattering module 100 is configured to cause the fuel to evenly flow into the cell module 200 after passing through the scattering module 100. The first fuel storage module 400 is configured to receive a liquid from the cell module 200 and reduce an oxidized fuel in the liquid from the cell module 200 by charging. The second fuel storage module 500 is configured to receive a liquid from the first fuel storage module 400 and deliver the liquid to the scattering module 100. The connection channels 700 are configured to connect between the second fuel storage module 500 and the scattering module 100, between the cell module 200 and the first fuel storage module 400, and between the first fuel storage module 400 and the second fuel storage module 500, to sequentially circulate the fuel between the scattering module 100, the cell module 200, the first fuel storage module 400, and the second fuel storage module 500. The controller 800 is electrically connected to the scattering module 100, the cell module 200, the first fuel storage module 400, and the second fuel storage module 500. The controller 800 controls a discharge power of the cell module 200 by controlling a flow rate of the air and a flow rate of the fuel.

To be specific, the cell module 200 includes a plurality of electrodes, for example. The electrodes are stainless steel sheets or other suitable materials, for example. The electrodes may be anodes and cathodes, and are alternately arranged in the form of an anode, a cathode, . . . , an anode, or in the form of a cathode, an anode, . . . , a cathode. The air is a gas comprising oxygen or pure oxygen, for example. The fuel is an electrolyte mixed with metal particles, for example. The metal is zinc (Zn), magnesium (Mg), aluminum (Al), or the like, for example. When the air and the fuel flow into the cell module 200, the metal in the fuel is oxidized and electrons are released, such that the cell module 200 outputs discharge.

In this embodiment, the metal fuel flow battery management system 10 further includes a first recycle bin 300. Two ends of the cell module 200 are respectively connected to the scattering module 100 and the first recycle bin 300, such that the first recycle bin 300 recycles the liquid from the cell modules 200. The liquid from the cell module 200 includes an unoxidized fuel and an oxidized fuel. One of the connection channels 700 is configured to connect between the first recycle bin 300 and the first fuel storage module 400, such that the first fuel storage module 400 receives the liquid from the cell module 200. In addition, the scattering module 100, the cell module 200, and the first recycle bin 300 may be connected through the connection channels 700. In another embodiment, the scattering module 100, the cell module 200, and the first recycle bin 300 may be closely joined to form one module.

In this embodiment, the metal fuel flow battery management system 10 further includes a first current meter 900. The first current meter 900 is connected to the cell module 200 and is configured to sense a current I1 of the cell module 200 after outputting discharge. The controller 800 is electrically connected to the first current meter 900 (i.e., the controller 800 is electrically connected to the cell module 200 through the first current meter 900) and obtains a value of the current I1 to obtain the discharge power of the cell module 200.

In this embodiment, the first fuel storage module 400 includes a first storage bin 410, a first barometer 420, a first thermometer 430, a first liquid level sensor 440, a second current meter 450, and a first suction pump 460. The first storage bin 410 is connected to the cell module 200 through the connection channel 700 and is configured to receive the liquid from the cell module 200. The first barometer 420 is connected to the first storage bin 410 and is configured to detect a pressure in the first storage bin 410. The first thermometer 430 is connected to the first storage bin 410 and is configured to detect a temperature of the first storage bin 410. The first liquid level sensor 440 is disposed in the first storage bin 410 and is configured to detect a liquid level in the first storage bin 410. The second current meter 450 is connected to the first storage bin 410 and is configured to detect a current I2 flowing through a liquid in the first storage bin 410 during charge and reduction. The controller 800 is electrically connected to the first fuel storage module 400 to obtain the pressure, the temperature, the liquid level, and the current I2. The first suction pump 460 is connected to the first storage bin 410 and is configured to lower the pressure in the first storage bin 410 by suction.

During the reduction of the oxidized fuel by the first fuel storage module 400 by charging, the power of charging may be supplied by an external power supply 20 connected to the first storage bin 410. The second current meter 450 may be electrically connected to the external power supply 20. During charge and reduction, the metal concentration in the fuel in the first storage bin 410 gradually increases, such that the internal resistance of the fuel gradually decreases. When the internal resistance of the fuel decreases to a level that may form an ON state of the fuel (i.e., the current I2 is approximate to 0), the external power supply 20 can no longer charge the fuel. In other words, the controller 800 may determine whether charge and reduction are completed by obtaining a value of the current I2.

In this embodiment, the second fuel storage module 500 includes a second storage bin 510, a second barometer 520, a second liquid level sensor 530, and a second suction pump 540. The second storage bin 510 is connected to the first storage bin 410 through the connection channel 700 and is configured to receive the liquid from the first fuel storage module 400. The second barometer 520 is connected to the second storage bin 510 and is configured to detect a pressure in the second storage bin 510. The second liquid level sensor 530 is disposed in the second storage bin 510 and is configured to detect a liquid level in the second storage bin 510. The controller 800 is electrically connected to the second fuel storage module 500 to obtain the pressure and the liquid level. The second suction pump 540 is connected to the second storage bin 510 and is configured to lower the pressure in the second storage bin 510 by suction.

In this embodiment, the controller 800 controls a pressure difference between the first storage bin 410 and the second storage bin 510 to deliver the fuel from the first storage bin 410 to the second storage bin 510 when the liquid level in the first storage bin 410 is greater than a predetermined value. Similarly, the controller 800 controls the pressure difference between the first storage bin 410 and the second storage bin 510 to deliver the fuel from the second storage bin 510 to the scattering module 100 when the liquid level in the second storage bin 510 is greater than a predetermined value.

In this embodiment, the controller 800 controls the first suction pump 460 and the second suction pump 540 to control the flow and the flow rate of the fuel. The fuel is delivered from the first storage bin 410 to the second storage bin 510 when the pressure in the first storage bin 410 is greater than the pressure in the second storage bin 510. The fuel is delivered from the second storage bin 510 to the scattering module 100 when the pressure in the first storage bin 410 is less than the pressure in the second storage bin 510. In other words, the controller 800 may regulate the first suction pump 460 and the second suction pump 540 to control the flow and the flow rate of the fuel by obtaining the pressure values detected by the first barometer 420 and the second barometer 520.

In this embodiment, the controller 800 controls the temperature of the first storage bin 410 by controlling the flow rate of the fuel. In other words, increasing the flow rate of the fuel may decrease the temperature. Therefore, the controller 800 may determine whether to increase the flow rate of the fuel by obtaining the temperature value detected by the first thermometer 430.

In this embodiment, the metal fuel flow battery management system 10 further includes a flow rate meter 1000. The flow rate meter 1000 is disposed on the connection channel 700 between the cell module 200 and the first fuel storage module 400, is electrically connected to the controller 800, and is configured to detect the flow rate of the fuel.

In this embodiment, the metal fuel flow battery management system 10 further includes a second recycle bin 600. One of the connection channels 700 is configured to connect between the second recycle bin 600 and the first suction pump 460 of the first fuel storage module 400, such that the second recycle bin 600 receives an air (e.g., oxygen) generated from the oxidized fuel in the first fuel storage module 400 during charge and reduction. When the first suction pump 460 is controlled to suction from the first storage bin 410, the suctioned gas flows into the second recycle bin 600.

In this embodiment, the scattering module 100 includes a scattering plate 110, an air valve 120, and a second thermometer 130. The scattering plate 110 is configured to receive the air and the fuel and cause the fuel to evenly flow into the cell module 200 after passing through the scattering plate 110. The air valve 120 is connected to the scattering plate 110. One of the connection channels 700 is configured to connect between the second recycle bin 600 and the air valve 120, such that the scattering plate 110 receives the air from the second recycle bin 600 through the air valve 120. The second thermometer 130 is connected to the scattering plate 110 and is configured to detect a temperature of the scattering plate 110.

In this embodiment, the controller 800 may control the flow rate of the air by controlling the air valve 120 or the first suction pump 460. For example, the opening size of the air valve 120 or the suction strength of the first suction pump 460 may determine the flow rate of the air.

In this embodiment, the controller 800 may control the temperature of the scattering plate 110 by controlling the flow rate of the fuel similarly to controlling the temperature of the first storage bin 410.

In this embodiment, the metal fuel flow battery management system 10 further includes a first check valve 1100 and a second check valve 1200. The first check valve 1100 is disposed in the connection channel 700 between the second fuel storage module 500 and the scattering module 100, and is configured to restrict the flow direction of the fuel. The second check valve 1200 is disposed in the connection channel 700 between the first fuel storage module 400 and the second fuel storage module 500, and is configured to restrict the flow direction of the fuel.

In this embodiment, the controller 800 includes, for example, a microcontroller unit (MCU), a central processing unit (CPU), a microprocessor, a digital signal processor (DSP), a programmable controller, a programmable logic device (PLD), or other similar devices or a combination of these devices, which is not limited by the disclosure. Furthermore, in an embodiment, the functions of the controller 800 may be implemented as a plurality of programming codes. The programming codes are stored in a memory and executed by the controller 800. Alternatively, in an embodiment, the functions of the controller 800 may be implemented as one or more circuits. The disclosure does not limit the implementation of the functions of the controller 800 in the form of software or hardware.

In summary of the foregoing, in an embodiment of the disclosure, the metal fuel flow battery management system includes a scattering module, a cell module, a first fuel storage module, a second fuel storage module, and a controller. The controller is electrically connected to the scattering module, the cell module, the first fuel storage module, and the second fuel storage module. The controller controls the discharge power of the cell module by controlling the flow rates of the air and the fuel. Accordingly, the metal fuel flow battery management system may be designed as an efficient management system: making the cell module output power stably at the same time of controlling the discharge power by regulating the flow rates of the air and the fuel and the power of reducing the oxidized fuel by charging. In the meantime, circulating the fuel also increases the service lifespan of the cell module.

In addition, by the first current meter, the first barometer, the first thermometer, the first liquid level sensor, the second barometer, the second liquid level sensor, the flow rate meter, the second thermometer, and the second current meter, the controller comprehensively monitors the discharge power, the flow rates of the fuel and the air, and the charging intensity, such that the system maintains high performance under dynamic balance. In the meantime, by controlling the first suction pump and the second suction pump to control the flow rates of the fuel and the air by vacuum suction, the system can operate at relatively low power consumption, addressing the issue of relatively high power consumption of the conventional flow battery. Moreover, oxygen generated after reduction of the oxidized fuel is recycled by the first suction pump, and then injected into the cell module through the air valve and the scattering plate, improving the discharge power of the cell module.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A metal fuel flow battery management system comprising:

a scattering module configured to receive an air and a fuel;

a cell module connected to the scattering module, the cell module configured for producing an oxidation reaction between the fuel flowing into the cell module and the air to discharge electric power, wherein the scattering module is configured to cause the fuel to evenly flow into the cell module after passing through the scattering module;

a first fuel storage module configured to receive a liquid from the cell module and reduce an oxidized fuel in the liquid from the cell module by charging;

a second fuel storage module configured to receive a liquid from the first fuel storage module and deliver the liquid to the scattering module;

a plurality of connection channels configured to fluidically connect between the second fuel storage module and the scattering module, between the cell module and the first fuel storage module, and between the first fuel storage module and the second fuel storage module, to sequentially circulate the fuel between the scattering module, the cell module, the first fuel storage module, and the second fuel storage module; and a controller electrically connected to the scattering module, the cell module, the first fuel storage module, and the second fuel storage module, wherein the controller is configured to control a discharge power of the cell module by controlling a flow rate of the air and a flow rate of the fuel.

2. The metal fuel flow battery management system according to claim 1, further comprising a first recycle bin, wherein two ends of the cell module are respectively connected to the scattering module and the first recycle bin, such that the first recycle bin recycles the liquid from the cell module, and one of the plurality of connection channels is configured to connect between the first recycle bin and the first fuel storage module, such that the first fuel storage module receives the liquid from the cell module.

3. The metal fuel flow battery management system according to claim 1, further comprising:

a first current meter connected to the cell module, the first current meter configured to sense a current of the cell module after discharging electric power, wherein the controller is electrically connected to the first current meter and obtains a value of the current to obtain the discharge power of the cell module.

4. The metal fuel flow battery management system according to claim 1, wherein the first fuel storage module comprises:

a first storage bin connected to the cell module through a portion of the plurality of connection channels, the first storage bin configured to receive the liquid from the cell module;

a first barometer connected to the first storage bin, the first barometer configured to detect a pressure in the first storage bin;

a first thermometer connected to the first storage bin, the first thermometer configured to detect a temperature of the first storage bin;

a first liquid level sensor disposed in the first storage bin, the first liquid level sensor configured to detect a liquid level in the first storage bin;

a second current meter connected to the first storage bin, the second current meter configured to detect a current flowing through a liquid in the first storage bin during charge and reduction; and a first suction pump connected to the first storage bin, the first suction pump configured to lower the pressure in the first storage bin by suction.

5. The metal fuel flow battery management system according to claim 4, wherein the second fuel storage module comprises:

a second storage bin connected to the first storage bin through an another portion of the plurality of connection channels, the second storage bin configured to receive the liquid from the first fuel storage module;

a second barometer connected to the second storage bin, the second barometer configured to detect a pressure in the second storage bin;

a second liquid level sensor disposed in the second storage bin, the second liquid level sensor configured to detect a liquid level in the second storage bin; and a second suction pump connected to the second storage bin, the second suction pump configured to lower the pressure in the second storage bin by suction.

6. The metal fuel flow battery management system according to claim 5, wherein the controller controls a pressure difference between the first storage bin and the second storage bin to deliver the fuel from the first storage bin to the second storage bin when the liquid level in the first storage bin is greater than a predetermined value.

7. The metal fuel flow battery management system according to claim 5, wherein the controller controls a pressure difference between the first storage bin and the second storage bin to deliver the fuel from the second storage bin to the scattering module when the liquid level in the second storage bin is greater than a predetermined value.

8. The metal fuel flow battery management system according to claim 5, wherein the controller controls the first suction pump and the second suction pump to control the flow rate of the fuel, wherein the fuel is delivered from the first storage bin to the second storage bin when the pressure in the first storage bin is greater than the pressure in the second storage bin; and the fuel is delivered from the second storage bin to the scattering module when the pressure in the first storage bin is less than the pressure in the second storage bin.

9. The metal fuel flow battery management system according to claim 4, wherein the controller controls the temperature of the first storage bin by controlling the flow rate of the fuel.

10. The metal fuel flow battery management system according to claim 1, further comprising:

a flow rate meter disposed on a portion of the plurality of connection channels between the cell module and the first fuel storage module, electrically connected to the controller, and configured to detect the flow rate of the fuel.

11. The metal fuel flow battery management system according to claim 1, further comprising a second recycle bin, wherein one of the plurality of connection channels is configured to connect between the second recycle bin and the first fuel storage module, such that the second recycle bin receives an air generated from the oxidized fuel in the first fuel storage module during charge and reduction.

12. The metal fuel flow battery management system according to claim 11, wherein the scattering module comprises:

a scattering plate configured to receive the air and the fuel and cause the fuel to evenly flow into the cell module after passing through the scattering plate;

an air valve connected to the scattering plate, wherein one of the plurality of connection channels is configured to connect between the second recycle bin and the air valve, such that the scattering plate receives the air from the second recycle bin through the air valve; and a second thermometer connected to the scattering plate, the second thermometer configured to detect a temperature of the scattering plate.

13. The metal fuel flow battery management system according to claim 12, wherein the controller controls the flow rate of the air by controlling the air valve.

14. The metal fuel flow battery management system according to claim 12, wherein the controller controls the temperature of the scattering plate by controlling the flow rate of the fuel.

15. The metal fuel flow battery management system according to claim 1, further comprising:

a first check valve disposed in a portion of the plurality of connection channels between the second fuel storage module and the scattering module.

16. The metal fuel flow battery management system according to claim 1, further comprising:

a second check valve disposed in a portion of the plurality of connection channels between the first fuel storage module and the second fuel storage module.

* * * * *